United States Patent [19]
Gehring et al.

[11] Patent Number: 6,059,653
[45] Date of Patent: *May 9, 2000

[54] AIR OUTLET ASSEMBLY HAVING CONTROLLABLE EFFORT GENERATION

[75] Inventors: Thomas Franz Josef Gehring, Scarborough; Slawomir Smolec, Toronto, both of Canada

[73] Assignee: Collins & Aikman Plastics, Inc., Troy, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/221,512

[22] Filed: Dec. 28, 1998

[51] Int. Cl.$^7$ ...................................................... B60H 1/34
[52] U.S. Cl. ............................ 454/155; 454/315; 454/319
[58] Field of Search ..................................... 454/152, 153, 454/155, 315, 316, 319, 320

[56] References Cited

U.S. PATENT DOCUMENTS

| | | | |
|---|---|---|---|
| 1,428,882 | 9/1922 | Dyer | 454/319 |
| 2,135,810 | 11/1938 | Germonprez | 454/319 |
| 2,395,319 | 2/1946 | Davies | 454/319 |
| 2,759,410 | 8/1956 | Hurt, Jr. | 454/319 |
| 2,987,981 | 6/1961 | Boylan | 454/319 |
| 3,952,639 | 4/1976 | Nobata . | |
| 4,060,024 | 11/1977 | Deck | 454/319 |
| 4,646,625 | 3/1987 | Schroeder . | |
| 4,928,582 | 5/1990 | Elfverson . | |
| 4,938,122 | 7/1990 | Ziemba | 454/319 |
| 5,036,753 | 8/1991 | Ostrand et al. . | |
| 5,338,252 | 8/1994 | Bowler et al. | 454/319 |
| 5,690,550 | 11/1997 | Mikowski | 454/155 |

Primary Examiner—Harold Joyce
Assistant Examiner—Derek S. Boles
Attorney, Agent, or Firm—Bliss McGlynn, P.C.

[57] ABSTRACT

An air outlet assembly includes a housing secured to a structure. A plurality of air directional fins, i.e., louvers or vanes, extend through the housing. The housing includes a plurality of receiving apertures. The receiving apertures receive bosses of the louvers therein. The receiving apertures define a boss surface and a spring surface. The boss surface has a radius of curvature equal to that of the boss being inserted. The spring surface has a radius of curvature greater than that of the boss being inserted. Two extensions are cut away on either side of both the boss surface and the spring surface to define the amount of effort required to rotate the boss when it is inserted into the receiving aperture. An opening is cut away adjacent the receiving aperture to further control the resilience of the spring surface as it abuts the boss inserted into the receiving aperture. This resiliency or spring characteristic creates a frictional force against which an effort must be applied in order to rotate the boss and, therefore, the louvers.

15 Claims, 3 Drawing Sheets

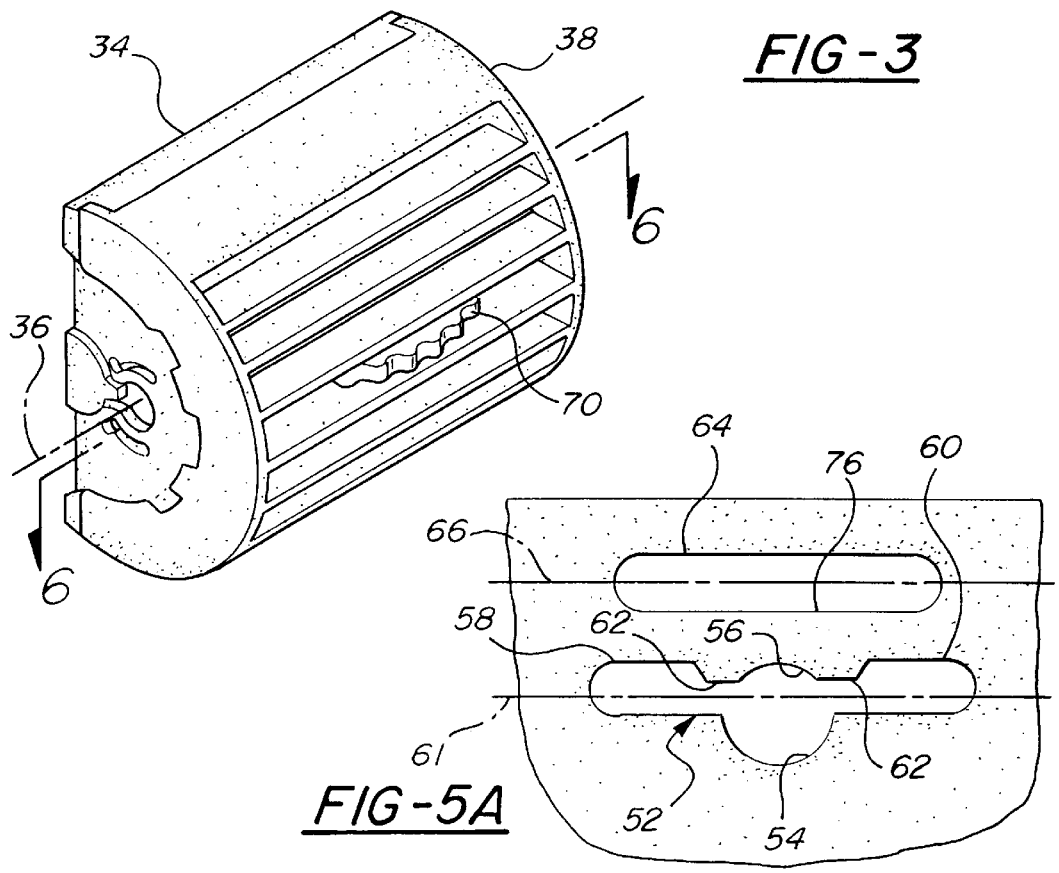
FIG-3
FIG-5A
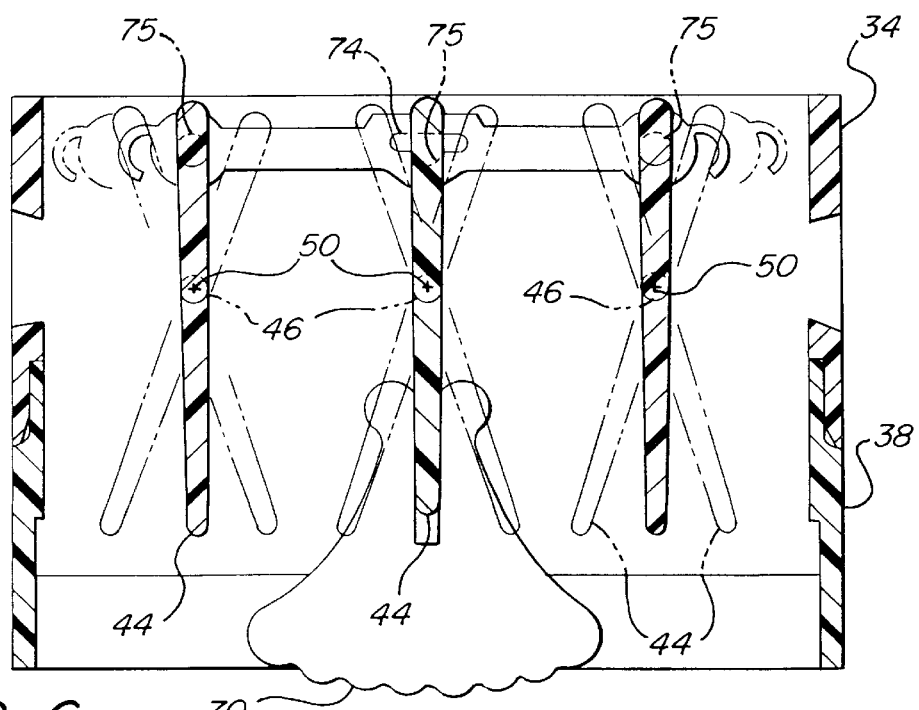
FIG-6

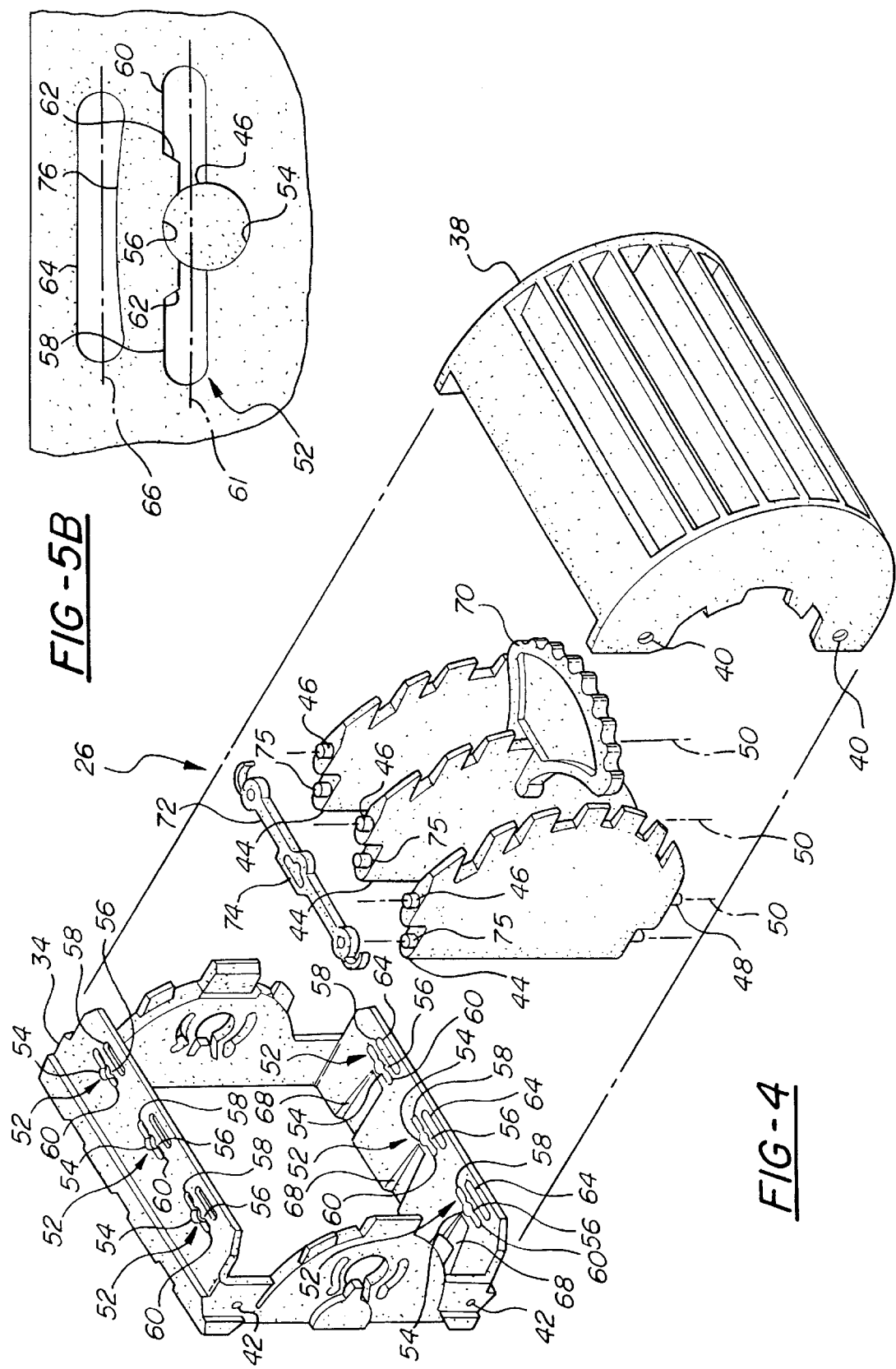

AIR OUTLET ASSEMBLY HAVING CONTROLLABLE EFFORT GENERATION

BACKGROUND OF THE INVENTION

1. Field of the Invention

The invention relates to air outlet assemblies. More particularly, the invention relates to air outlet assemblies having a controlled effort generation between a boss and a boss retention device as they are employed in air outlet assemblies for motor vehicles.

2. Description of the Related Art

Air outlet assemblies are used throughout the passenger compartment of a motor vehicle. They are used to direct and defuse conditioned air as it enters the passenger compartment. Air directional fins, such as louvers and vanes ("louvers") are used to direct the air flow. They extend through the air outlet assembly generally parallel to each other. In many designs, there are two sets of louvers wherein one set of parallel louvers is perpendicular to the second set of parallel louvers. The two sets of louvers allow for the direction of air flow in two directions, up-and-down and side-to-side.

The louvers are pivotally secured to a structure, typically a housing, by use of a pair of bosses or extensions that extend into apertures in the structure. The bosses are typically cylindrical or, at a minimum, symmetrical. The apertures are circular. They have a diameter which closely matches the outer diameter of the bosses. As may be seen in FIG. 2, an air outlet assembly of the prior art is generally indicated at 10. The air outlet includes air directional fins 12 which pivot about bosses (not shown). The bosses extend through holes 14 wherein, as discussed above, the diameter of the holes 14 closely approximates the outer diameter of the bosses.

If the diameter of the holes 14 is too large with respect to the bosses, the air directional fins 12 will rattle and lose the position to which they are set. If, on the other hand, the holes 14 are too small with respect to the diameter of the bosses, it will be difficult to move the air directional fins 12. More specifically, the effort required to move the air directional fins 12 will be too great resulting in unnecessary forces being applied to the mechanisms relating to the movement of the air directional fins by the operator thereof.

Therefore, there is a need in the art to provide an air outlet assembly wherein the retention of a boss within the housing of the air outlet assembly may be regulated and designed for specific effort generation based on the criteria set forth by the manufacturer of the motor vehicle.

SUMMARY OF INVENTION

An air outlet assembly is disclosed for allowing air to pass through a structure. The air outlet assembly includes a frame which is securable to the structure. The air outlet assembly further includes a plurality of air directional fins which extend through the frame. Each of the plurality of air directional fins is parallel to each other. Each of the plurality of air directional fins include first and second bosses defining a longitudinal axis about which each of the plurality of air directional fins pivots. The air outlet assembly also includes a housing secured to the frame. The housing rotates the plurality of air directional fins about a lateral axis perpendicular to the longitudinal axis. The housing includes receiving apertures for receiving the first and second bosses therein. Each of the receiving apertures includes a boss surface defining a boss radius of curvature and a spring surface defining a spring radius of curvature for engaging each of the first and second bosses. The spring radius of curvature is greater than or equal to the boss radius of curvature.

One advantage associated with the invention is the ability to provide an air outlet assembly having air directional fins capable of being pivoted about two bosses. Another advantage associated with the invention is the ability to retain the bosses within the air outlet assembly uniformly. Yet another advantage associated with the invention is the ability to design the amount of effort required to move the air directional fins by designing the spring surface and its relation to each of the bosses. Yet another advantage associated with the invention is the ability to adjust, by design, the amount of effort required to move the air directional fins while continuing to prevent the air directional fins from rattling or vibrating with respect to the air outlet assembly such that the air directional fins generate noise.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a perspective view of an air outlet assembly incorporating one embodiment of the invention;

FIG. 4 is an exploded perspective view of the air outlet assembly incorporating embodiments of the invention;

FIGS. 5A and 5B are top views, partially cut away, of one embodiment of the invention without a boss and with a boss extending therethrough, respectively; and FIG. 6 is a cross-sectional top view of the air outlet assembly taken along lines 6—6 in FIG. 3.

DETAILED DESCRIPTION OF THE PREFERRED EMBODIMENT

Figure 1:
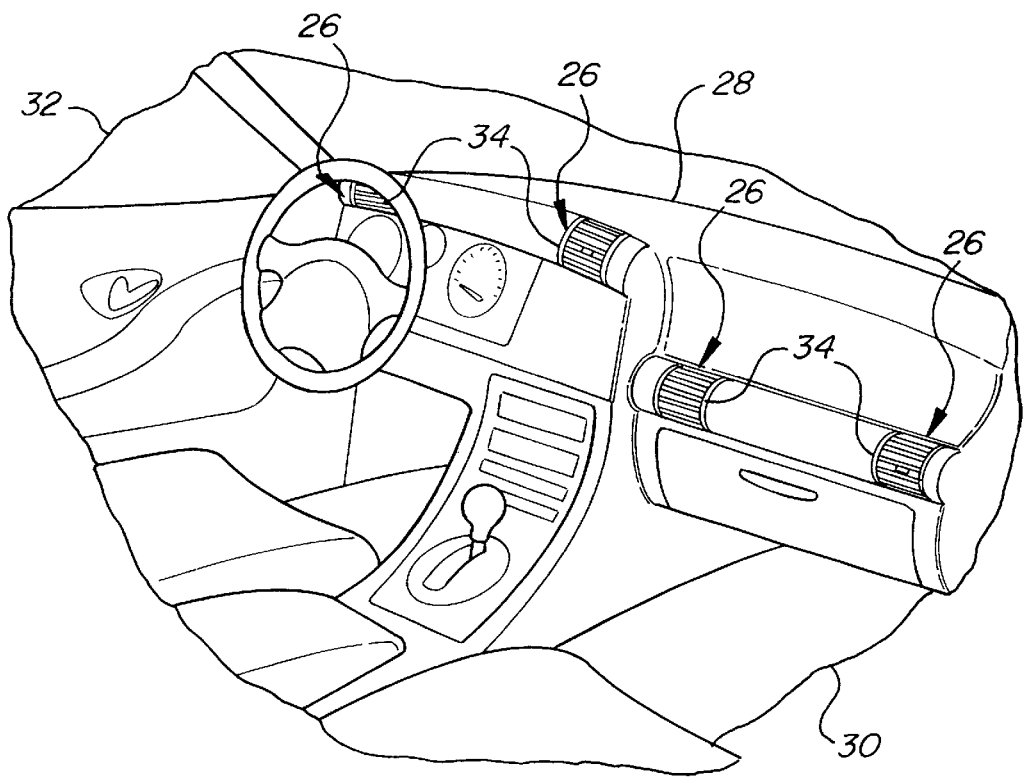
FIG. 1 is a perspective view, partially cut away, of a passenger compartment of a motor vehicle incorporating one embodiment of the prior art.
Figure 2:
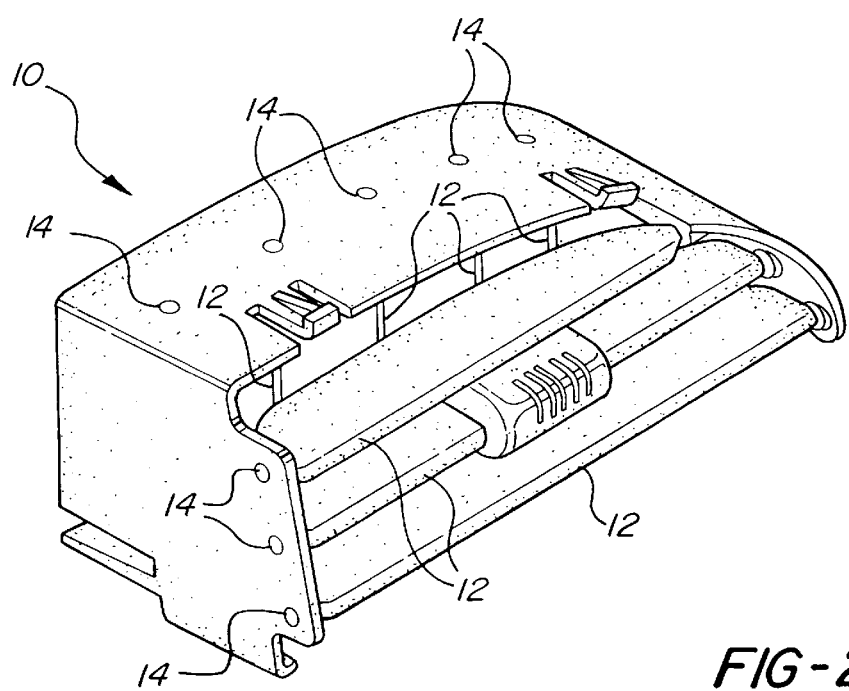
FIG. 2 is a perspective view of an air outlet assembly of the prior art.

Referring to FIGS. 1 and 3 through 6, an air outlet assembly incorporating the invention is generally indicated at 26. The air outlet assembly 26 allows the fluid, i.e., air, to pass through a structure 28. The structure 28 may be any component of a passenger compartment 30 of a motor vehicle 32. Typically, the structure 28 may include an instrument panel, a center console, head liner, pillars, seating structures and the like.

The air outlet assembly 26 includes a housing 34. The housing 34 is secured to the structure 28. Depending upon the design of the air outlet assembly 26, the housing 34 may or may not be rotatable with respect to the structure 28. In the embodiment shown in the Figures, the housing 34 is rotatable about a lateral axis 36.

A frame 38 is secured to the housing 34. The frame 38 may be rotatably secured to the housing 34. In the preferred embodiment, however, the frame 38 is fixedly secured to the housing 34 with no lost motion there between. The frame 38 is snap-fit to the housing 34 using a plurality of holes 40 in the housing 34 that receive protrusions 42 which extend out from the frame 38.

A plurality of air directional fins 44 extend through the housing 34 and the frame 38. Each of the plurality of air directional fins 44, or louvers 44, are parallel to each other. Each of the air directional fins 44 includes a first boss 46 and a second boss 48. The first 46 and second 48 bosses define a longitudinal axis 50. The longitudinal axis 50 is generally perpendicular to the lateral axis 36. Each of the air directional fins 44 pivots about each of their respective longitudinal axes 50.

The housing 34 includes a plurality of receiving apertures, generally shown at 52. Each of the receiving apertures 52 receives either a first boss 46 or a second boss 48 therein. The receiving apertures 52 hold the bosses 46, 48 therein while the louvers 44 pivot about their respective longitudinal axes 50. Each of the receiving apertures 52 includes a boss surface 54. The boss surface 54 defines a boss radius of curvature. Each of the receiving apertures 52 also includes a spring surface 56 defining a spring radius of curvature. Both the boss surface 54 and the spring surface 56 engage the outer surface of the first 46 and second 48 bosses.

The boss surface 54 defines the boss radius of curvature. This radius of curvature is equal to the radius of curvature of the outer diameter of the particular boss 46, 48 which is received therein. More specifically, the boss surface 54 matches the outer surface of the boss 46, 48 which is received thereby.

The spring surface 56 defines the spring radius of curvature as being that which is greater than or equal to the boss radius of curvature. Likewise, the spring radius of curvature is greater than or equal to the radius of curvature of the outer diameter of the particular boss 46,48 which is received thereby. The contact between the spring surface 56 and the boss 46, 48 will be discussed in greater detail subsequently.

The receiving apertures 52 include first 58 and second 60 extensions which extend out from the boss surface 54 and the spring surface 56. The first 58 and second 60 extensions separate the boss 54 and spring 56 surfaces. Therefore, the boss surface 54 and the spring surface 56 do not intersect or connect with each other. The extensions 58, 60 define an axis 61 which is generally parallel to the lateral axis 36. The extensions 58, 60 of the receiving apertures 52 are cut out of the housing 34 much like the boss surface 54 and spring surface 56 of the receiving aperture 52. The extensions 58, 60 define protrusions 62 on either side of the spring surface 56. The protrusions 62 extend the spring surface 56 into the receiving aperture 52 an amount sufficient to receive and contact the boss 46, 48.

The housing 34 further defines a plurality of openings 64, each of which is disposed adjacent each of the receiving apertures 52. The openings 64 are disposed a predetermined distance from each of the receiving apertures 52. Each of the openings 64 defines an opening axis 66 which also extends parallel to the lateral axis 36 and the axis 61 of the extensions 58, 60. In the preferred embodiment, the openings 64 extend along the opening axis 66 a length shorter than the length defined by the first 58 and second 60 extensions.

The housing 34 includes a guide 68 which extends along a surface of the frame 38 for each of the boss surfaces 54. Each of the guides 68 guides each of the bosses 46, 48 into each of the receiving apertures 52. In the embodiment shown in the Figures, each of the guides 68 is an indentation or channel within the housing 34.

The louvers 44 are moved using a central thumb handle 70 which is attached to a single louver 44, generally in the center of the set or plurality of louvers 44. Movement of that central louver 44 is transmitted to the remaining louvers 44 using a base element or louver arm 72. The louver arm 72 includes at least one louver receiving aperture 74 which is similar in construction to the receiving apertures 52 of the frame 38. Therefore, the louver receiving apertures 74 incorporate all of the invention of the receiving aperture 52 of the frame 38 because the louver arm 72 receives either the first bosses 46 or the second bosses 48 therein. The louver arm 72 may be mounted on a set of bosses 46, 48 or, as is shown in FIGS. 4 and 6, they are mounted on a second set of bosses 75 disposed adjacent the first set of bosses 46.

Once a boss 44, 46 is inserted into the receiving aperture 52, the boss 44, 46 forces the spring surface 56 to move out of a plane in which it is located when not in use. The spring surface 56 is distorted around the boss 44, 46. In the instance when the spring surface 56 has a radius of curvature greater than that of the boss 44,46, the spring surface 56 is distorted such that more of the spring surface 56 engages the boss 44, 46 than the initial point of contact. In fact, the portion of the spring surface 56 that engages the boss 44, 46 extends through a shallow arc therealong.

When designing or calculating the amount of force required to pivot a boss 46, 48 having a boss radius of curvature secured within a frame 38 having a boss receiving aperture 52, the method includes the steps of defining a boss surface 54 within the boss receiving apertures 52 which has a radius of curvature substantially equal to that of the boss radius of curvature. Then, the spring surface 56 is defined within the boss receiving aperture 52 having a radius of curvature greater than that of the boss radius of curvature. The length of the first extension 58 and the second extension 60 is then defined. As the length of the first 58 and second 60 extensions increases, the amount of force provided the spring surface 56 decreases. Therefore, the amount of effort required to move the louvers 44 about their longitudinal axes 50 is inversely proportional to the length of the first 58 and second 60 extensions. Finally, the distance the opening 64 is from the boss receiving apertures 52 is then defined. As the distance between the opening and the receiving apertures 52 grows or thickens, the greater the effort which must be generated to overcome the force of the spring surface 56 on the boss 46, 48. More specifically, as a spring element 76, defined as the portion of the housing 34 extending between the opening 64 and the receiving apertures 52, get wider, the stronger the spring element 76 becomes.

Therefore, by defining the first 58 and second 60 extensions and the width of the spring element 76, it may be determined with great precision the amount of effort required to be generated by the operator of the air outlet assembly 26 which must be overcome to move the louvers 44 about their longitudinal axes 50. In the preferred embodiment, the length of the first 58 and second 60 extensions is adjusted to tune the amount or strength of the spring element 76 because this adjustment is more robust in that the strength of the resilience of the spring element 76 is not compromised as it would be if the opening 64 is moved closer to the receiving aperture 52.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. An air outlet assembly allowing air to pass through a structure, said air outlet assembly comprising:

a frame securable to the structure;

a plurality of air directional fins extending through said frame, each of said plurality of air directional fins being parallel to each other and including first and second bosses defining a longitudinal axis to pivot thereabout; and a housing secured to said frame for rotating said plurality of louvers about a lateral axis perpendicular to said longitudinal axis, said housing including receiving apertures for receiving said first and second bosses therein, each of said receiving apertures including a boss surface defining a boss radius of curvature and a spring surface defining a spring radius of curvature for engaging each of said first and second bosses, said spring radius of curvature being greater than or equal to said boss radius of curvature.

2. An air outlet assembly as set forth in claim 1 wherein each of said receiving apertures include a first extension and a second extension extending out from said boss and spring surfaces separating said boss surface from said spring surface.

3. An air outlet assembly as set forth in claim 2 wherein said housing defines an opening disposed adjacent each of said receiving apertures, said opening defining an opening axis extending parallel to said lateral axis.

4. An air outlet assembly as set forth in claim 3 wherein said opening extends along said opening axis a length shorter than a length defined by said first and second extensions.

5. An air outlet assembly as set forth in claim 4 wherein said first and second extensions define protrusions on either side of said spring surface.

6. An air outlet assembly as set forth in claim 5 wherein said housing includes a guide extending from each of said boss surfaces to guide said first and second bosses into each of said receiving apertures.

7. An air outlet assembly allowing air to pass through an opening in a structure, said air outlet assembly comprising:

a plurality of louvers extending through the opening, each of said plurality of louvers including first and second bosses defining a longitudinal axis to pivot thereabout; and a housing rotatably secured to the structure, said housing rotating said plurality of louvers about a lateral axis perpendicular to said longitudinal axis, said housing including receiving apertures for receiving said first and second bosses therein, each of said receiving apertures including a boss surface defining a boss radius of curvature and a spring surface defining a spring radius of curvature for engaging each of said first and second bosses, said spring radius of curvature being greater than said boss radius of curvature.

8. An air outlet assembly as set forth in claim 7 wherein each of said receiving apertures include a first extension and a second extension extending out from said boss and spring surfaces separating said boss surface from said spring surface.

9. An air outlet assembly as set forth in claim 8 wherein said housing defines an opening disposed adjacent each of said receiving apertures, said opening defining an opening axis extending parallel to said lateral axis.

10. An air outlet assembly as set forth in claim 9 wherein said opening extends along said opening axis a length shorter than a length defined by said first and second extensions.

11. An air outlet assembly as set forth in claim 10 wherein said first and second extensions define protrusions on either side of said spring surface.

12. An air outlet assembly as set forth in claim 11 wherein said housing includes a guide extending from each of said boss surfaces to guide said first and second bosses into each of said receiving apertures.

13. A base element for receiving a rotatable boss therein, said base element comprising:

a base;

a receiving aperture for receiving a circular boss therein, said receiving aperture including a boss surface defining a boss radius of curvature and a spring surface defining a spring radius of curvature for engaging a circular boss, said spring radius of curvature being greater than said boss radius of curvature;

a first extension and a second extension extending out from said boss and spring surfaces separating said boss surface from said spring surface; and first and second extensions defining protrusions on either side of said spring surface.

14. A base element as set forth in claim 13 including an opening disposed adjacent said receiving aperture.

15. A method for controlling the amount of force required to pivot a boss having a boss radius of curvature secured in a frame having a boss receiving aperture, the method comprising the steps of:

defining a boss surface within the boss receiving aperture having a radius of curvature substantially equal to that of the boss radius of curvature;

defining a spring surface within the boss receiving aperture having a radius of curvature greater than the boss radius of curvature;

defining the length of a first extension and a second extension; and defining the distance an opening is disposed from the first and second extensions.

* * * * *

UNITED STATES PATENT AND TRADEMARK OFFICE
CERTIFICATE OF CORRECTION

PATENT NO.    : 6,059,653
DATED         : May 9, 2000
INVENTOR(S)   : Gehring et al.

It is certified that error appears in the above-identified patent and that said Letters Patent is hereby corrected as shown below:

<u>Title page,</u>
Item [*], Notice should be deleted.

Signed and Sealed this

Eighth Day of October, 2002

Attest:

Attesting Officer

JAMES E. ROGAN
Director of the United States Patent and Trademark Office